US011625329B2

(12) United States Patent
Kucherov et al.

(10) Patent No.: US 11,625,329 B2
(45) Date of Patent: Apr. 11, 2023

(54) METHOD AND SYSTEM FOR HOST-BASED CACHING

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/743,729

(22) Filed: Jan. 15, 2020

(65) Prior Publication Data

US 2021/0216462 A1 Jul. 15, 2021

(51) Int. Cl.

*G06F 12/0864* (2016.01)
*G06F 12/0868* (2016.01)
*G06F 12/02* (2006.01)
*G06F 12/0871* (2016.01)
*G06F 12/0804* (2016.01)

(52) U.S. Cl.

CPC ...... *G06F 12/0864* (2013.01); *G06F 12/0292* (2013.01); *G06F 12/0804* (2013.01); *G06F 12/0868* (2013.01); *G06F 12/0871* (2013.01)

(58) Field of Classification Search

None

See application file for complete search history.

(56) References Cited

U.S. PATENT DOCUMENTS 7,707,136 B2 * 4/2010 Vosshall .................. G06F 16/27 711/161
8,352,692 B1 * 1/2013 Jordan ................ H04L 67/1046 711/216
8,868,505 B1 * 10/2014 Jayanthi .................. H04L 63/04 707/674
9,519,581 B2 * 12/2016 Banta .................. G06F 12/0804
9,977,760 B1 * 5/2018 Diehl ...................... G06F 16/13
2005/0038907 A1 * 2/2005 Roeder ................... H04L 45/00 709/238
2014/0006713 A1 * 1/2014 Samih ................. G06F 12/0813 711/121
2015/0006846 A1 * 1/2015 Youngworth ......... G06F 3/0619 711/216
2015/0213049 A1 * 7/2015 Kleiman ............. G06F 16/1752 707/692
2015/0277775 A1 * 10/2015 Manoharan ......... G06F 9/45558 711/114
2018/0018190 A1 * 1/2018 Heller ................... G06F 12/109
2018/0157752 A1 * 6/2018 Arikatla ................ G06F 16/182
2020/0287874 A1 * 9/2020 Bertram .................. H04L 9/321

* cited by examiner

*Primary Examiner* — Charles Rones
*Assistant Examiner* — Ryan Dare
(74) *Attorney, Agent, or Firm* — Krishnendu Gupta; Deepika Bhayana; Lesley A. Leonessa

(57) ABSTRACT

A method is used in host-based caching. A host receives a request for data, and identifies a host in a plurality of hosts that owns the data.

20 Claims, 7 Drawing Sheets

| Mask | Host |
|---|---|
| xx00 | $Host_1$ |
| xx01 | $Host_2$ |
| xx10 | $Host_3$ |
| xx11 | $Host_4$ |

METHOD AND SYSTEM FOR HOST-BASED CACHING

BACKGROUND

Technical Field

This application relates to host-based caching for a data storage system.

Description of Related Art

Computer systems may include different resources used by one or more host processors. Resources and host processors in a computer system may be interconnected by one or more communication connections. These resources may include, for example, data storage devices. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations. The data requests may be generated based on applications executing on the host systems.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply “disks” or “drives”). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as “disk arrays” or “storage arrays”) and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Host systems include caches for temporarily storing data in volatile memory, to increase application performance. The caches may store pages of data from the data storage system. The performance of applications is heavily influenced by the speed with which an application can retrieve data. As such, it is important to cache as much data as possible to improve performance of the applications.

SUMMARY OF THE INVENTION

One aspect of the current technique is a method for host-based caching. The method includes receiving, by a host, a request for data. The method also includes identifying, by the host, a host in a plurality of hosts that owns the data.

The method may include identifying the host that owns the dataspace portion that includes the data. The host that received the request for data may own the data, and may retrieve the data from its own cache. The host may request the data from the host that owns the data. The host may determine a hash value corresponding to the data, and identify the host that owns the data based on the hash value. The host may identify the host that owns the data by matching a subset of bits in the hash value with a bit pattern associated with the host. The host may identify the host that owns the data by searching a translation table for a subset of bits from the hash value, and identifying a host associated with the subset of bits. The host may request the data from the host that owns the data. The request may include the hash value.

Another aspect of the current technique is a system, with a processor, for host-based caching. The processor is configured to receive a request for data, and identify a host in a plurality of hosts that is storing the data in its cache. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
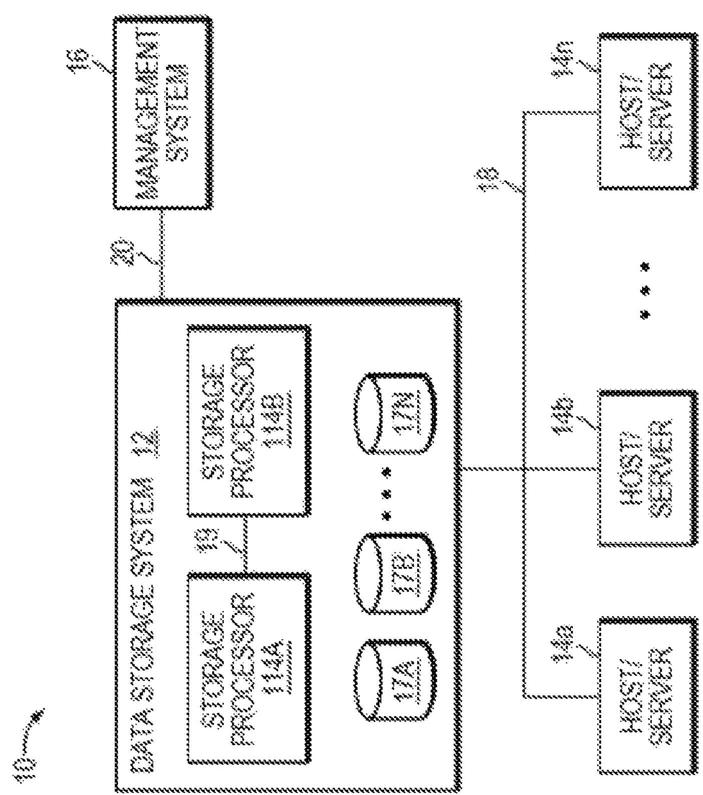
FIG. 1 depicts an exemplary embodiment of a computer system that may utilize the techniques described herein.

Described below is a technique for host-based caching in a data storage system, which technique may be used to provide, among other things, receiving a request for data, and identifying a host in a plurality of hosts that owns the data.

Caching is a technique to speed up data requests from application programs by saving frequently accessed data in memory for quick recall without having to physically retrieve the data from the storage devices. In conventional computer systems, each host separately maintains its own cache. When a host requires data, the host first searches its own cache. If the data cannot be found, the host sends a request to a storage device to retrieve the data. After the data is served to the host, the host may load the data into its cache, or alternatively, drop the data. Because each host has access solely to its own cache, the caches of the hosts may collectively include duplicate entries. Furthermore, even if one host already has certain data in its own cache, another host may nevertheless incur a disk access if its own cache does not store the data.

Through the techniques described herein, hosts share data in their caches. Each host owns a portion of the dataspace (also referred to herein as "owned dataspace portion"). A host reserves a portion of its cache (also referred to herein as "sub-cache") for data in its own dataspace portion, and makes the data in this sub-cache available to other hosts. Each host also reserves another sub-cache of its cache to identify the host that owns data of interest. Thus, when a host requires data, the host first searches its own cache. If the search yields a cache miss, the host identifies the host that owns the data, which may have cached the data. The host requests the data from the host that owns the data, thereby obtaining the data without retrieving the data from storage.

Because the techniques described herein enable hosts to access data stored in one another's caches, the hosts may avoid incurring disk accesses. Advantageously, the hosts may experience shorter latencies for read requests. Furthermore, the reduced load on the storage devices shortens the latency for the read requests that require disk accesses, thereby also enabling the storage devices to allocate more resources to background processes. Additionally, in some embodiments, the reduction in disk accesses may decrease the cost of the overall storage system, such as in cloud computing environments that levy fees for access to storage. The dataspace may be apportioned among the hosts according to the hash values of the data. The hash values may be determined using a cryptographic hash function, such as Secure Hash Algorithm 1 (SHA-1), though any cryptographic hash function may be used. Each host may be associated with one or more unique bit patterns (also referred to herein as "masks"). If certain bits of a hash value, such as the first byte, match a host's mask, the host owns the data. If a host has retrieved such data from a storage device, the host may store the data in its sub-cache to be shared with other hosts.

Advantageously, host-based caching scales the amount of data available to the hosts with shorter latency than disk access. This availability improves the performance of hosts when they are experiencing I/O requests that would otherwise exhibit a low cache hit pattern. Moreover, because host-based caching confers ownership of different portions of the dataspace to different hosts, any given data resides on the sub-cache to be shared, for solely one host. Consequently, the techniques described herein deduplicate the data stored across the hosts. In at least some implementations in accordance with the techniques as described herein, the use of host-based caching techniques in data storage systems can provide one or more of the following advantages: improved latency for I/O requests, higher cache hits rates, reduced wear on storage devices, and lower costs associated with decreased storage use (e.g., computing environments that levy charges based on storage access).

FIG. 1 depicts an example embodiment of a computer system 10 that may be used in connection with performing the techniques described herein. The system 10 includes one or more data storage systems 12 connected to server or hosts 14*a*-14*n* through communication medium 18. The system 10 also includes a management system 16 connected to one or more data storage systems 12 through communication medium 20. In this embodiment of the system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14*a*-14*n* may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14*a*-14*n* and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14*a*-14*n* and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14*a*-14*n*, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14*a*-14*n*, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14*a*-14*n* may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14*a*-14*n* and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14*a*-14*n* may perform different types of data operations in accordance with different types of tasks.

In the embodiment of FIG. 1, any one of the hosts 14*a*-14*n* may issue a data request to the data storage systems 12 to perform a data operation. For example, an application executing on one of the hosts 14*a*-14*n* may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17*a*-17*n*. Unless noted otherwise, data storage devices 17*a*-17*n* may be used interchangeably herein to refer to hard disk drive, solid state drives, and/or other known storage devices. One or more data storage devices 17*a*-17*n* may be manufactured by one or more different vendors. Each of the data storage systems included in 12 may be inter-connected (not shown). Additionally, the data storage systems 12 may also be connected to the hosts 14*a*-14*n* through any one or more communication connections that may vary with each particular embodiment. The type of communication connection used may vary with certain system parameters and requirements, such as those related to bandwidth and throughput required in accordance with a rate of I/O requests as may be issued by the hosts 14*a*-14*n*, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14*a*-14*n*, provide data and access control information through channels on the communication medium 18 to the data storage systems 12, and the data storage systems 12 may also provide data to the host systems 14*a*-14*n* also through the channels 18. The hosts 14*a*-14*n* may not address the disk drives of the data storage systems 12 directly, but rather access to data may be provided to one or more hosts 14*a*-14*n* from what the hosts 14*a*-14*n* view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14*a*-14*n* allowing the hosts 14*a*-14*n* to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17*a*-17*n* and two storage processors 114A, 114B. The storage processors 114A, 114B may include a central processing unit (CPU) and memory and ports (not shown) for communicating with one or more hosts 14*a*-14*n*. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14*a*-14*n*, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
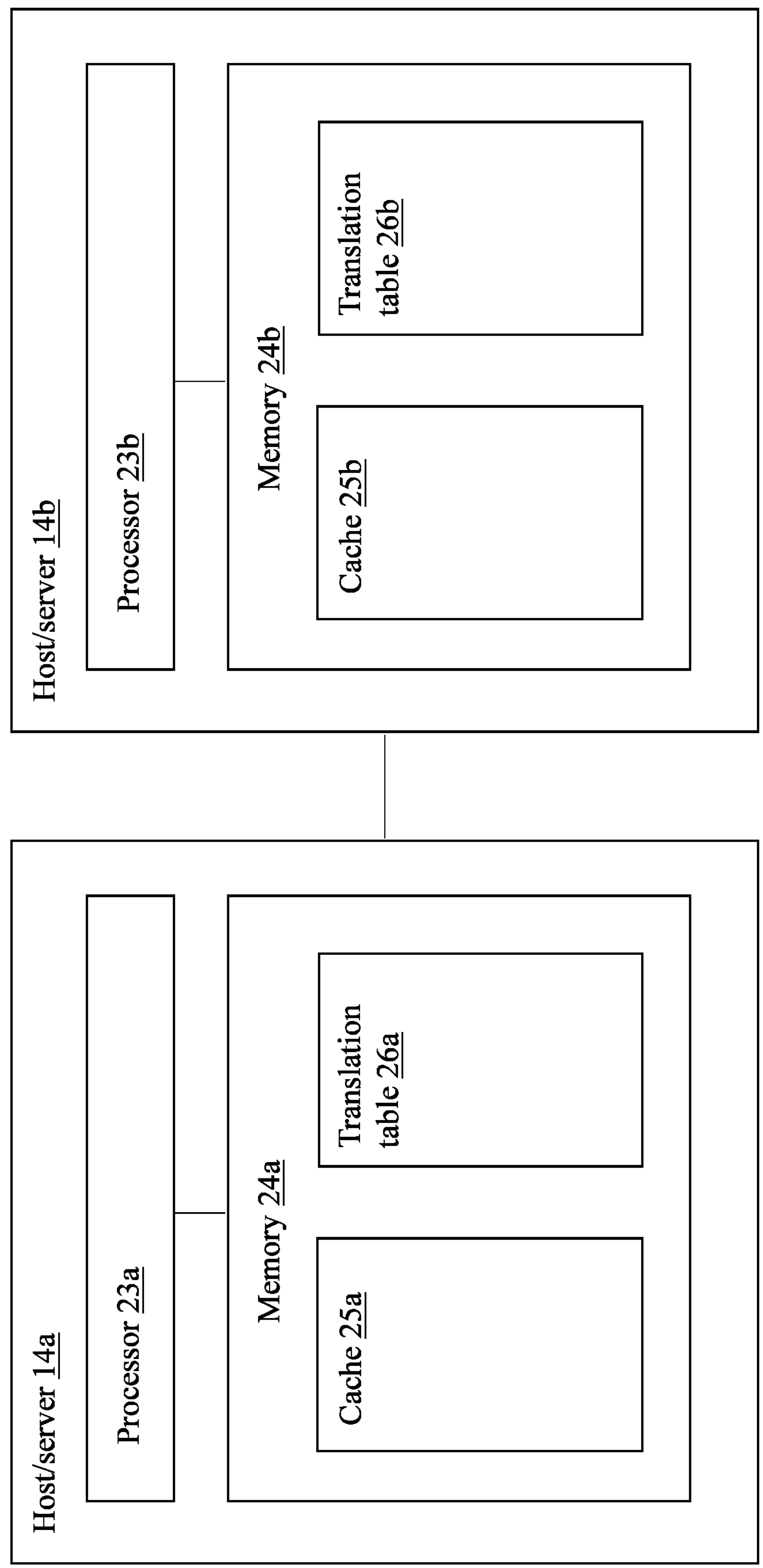
FIG. 2 depicts exemplary embodiments of two hosts used in the computer system of FIG. 1.

FIG. 2 depicts exemplary embodiments of two hosts 14*a*, 14*b* used in the computer system 10 of FIG. 1. Each host 14*a*, 14*b* includes one or more processors 23*a*, 23*b* and memory 24*a*, 24*b*. The memory 24*a*, 24*b* includes a cache 25*a*, 25*b* and a translation table 26*a*, 26*b*. As described above, a host 14*a* may execute applications that perform read and/or write operations. For a read operation, the host 14*a* first searches its own cache 30*a* for the desired data itself. If the data cannot be found, the host 14*a* searches its cache 35*a*, using the address of the data, to find a hash value for the data. If the hash value is found, the host 14*a* uses the translation table 26*a* to identify the host 14 that owns the data (in this example, host 14*b*). The host 14*a* requests the data from the host 14*b*. If the host 14*b* has stored the data in its cache 25*b*, the host 14*b* returns the data to the host 14*a*, which may load the data into its own cache 25*a*. If the cache 25*b* of the host 14*b* has not stored the data, the host 14*b* may retrieve the data from the data storage system 12, cache the data, and transmit the data to the host 14*a*. Alternatively, the host 14*b* may deny the request from the host 14*a*, and the host 14*a* may retrieve the data from the data storage system 12.

For a write operation, the host 14*a* sends a write request to the data storage system 12. If the host 14*a* is already storing the data in its cache 25, the host 14*a* invalidates the corresponding entry.

Figure 3:
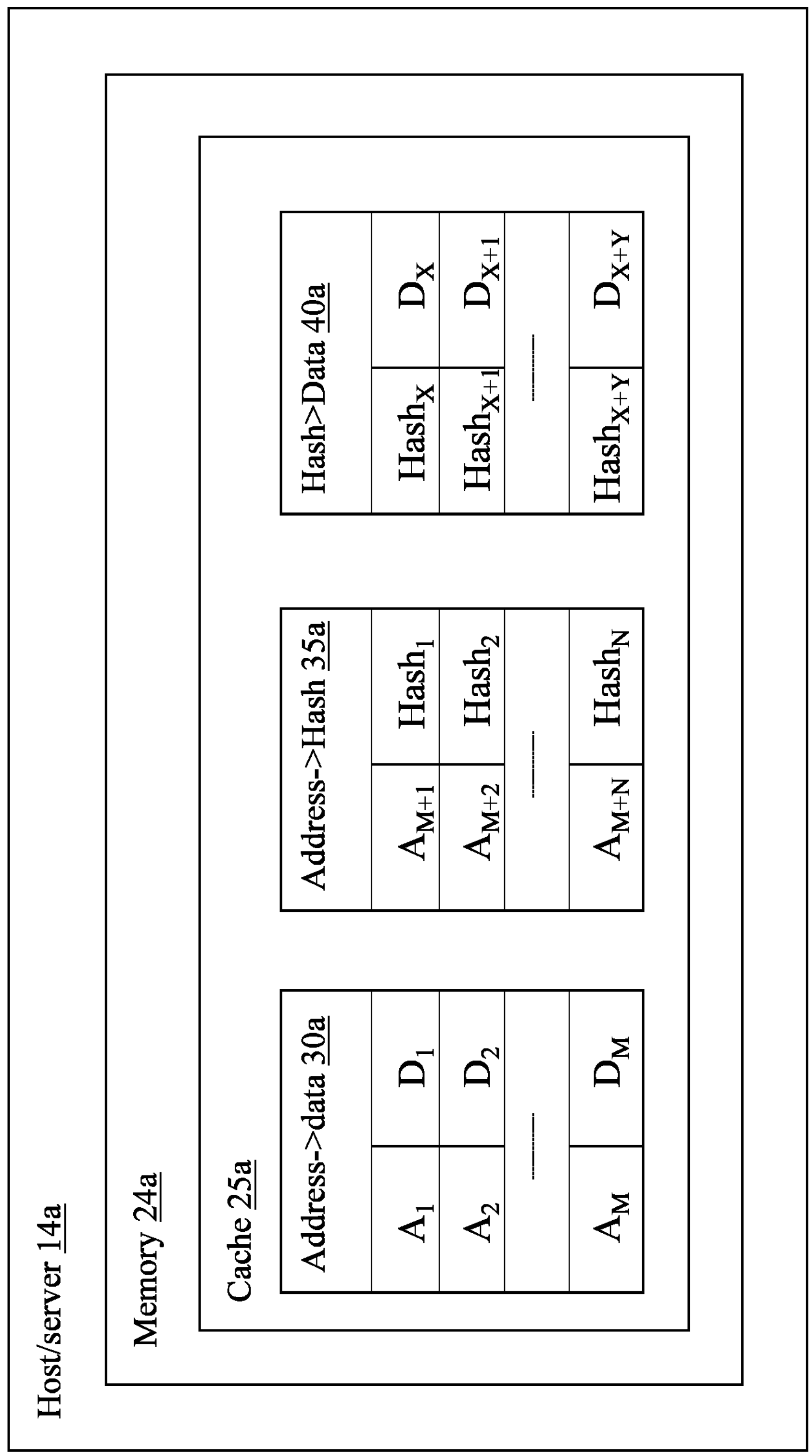
FIG. 3 is an exemplary block diagram depicting, in more detail, the three sub-caches used in one of the hosts of FIG. 2.
Figure 4:
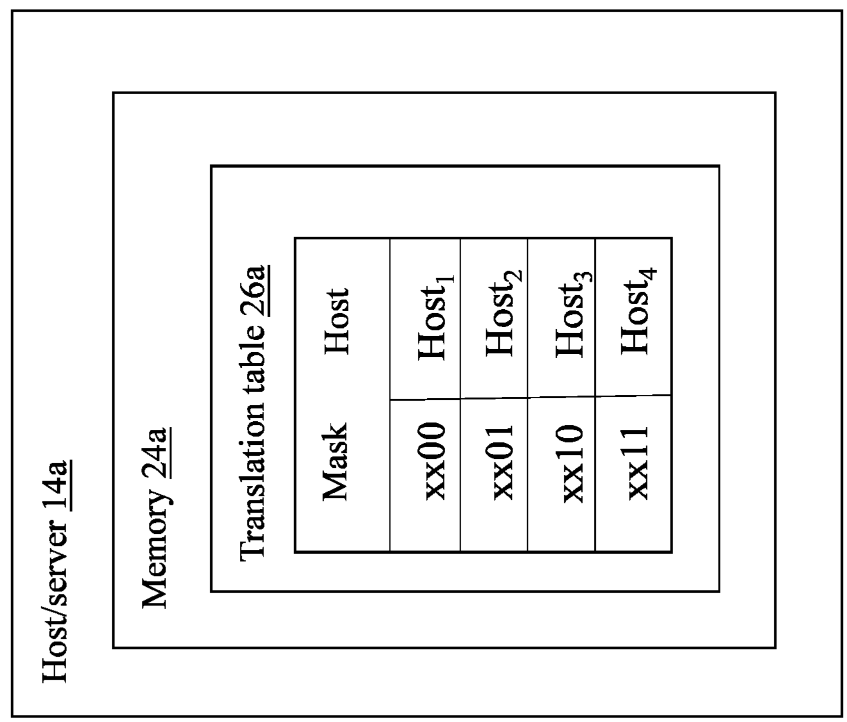
FIG. 4 is an exemplary block diagram depicting, in more detail, the translation table used in one of the hosts of FIG. 2.

FIGS. 3 and 4 depict block diagrams of the host 14*a* in FIG. 2, with the cache 25*a* and translation table 26*a* in more detail. Although FIGS. 3 and 4 depict host 14*a*, the same details may be implemented in the caches 25*b*-25*n* and translation tables 26*b*-26*n* of other hosts 14*b*-14*n* in the computer system 10. The cache 25*a* is divided into three sub-caches 30*a*, 35*a*, 40*a*. The first sub-cache 30*a* includes M entries, storing addresses and their associated data, ($A_1$, $D_1$) . . . ($A_M$, $D_M$). The second sub-cache 35*b* includes N entries, storing addresses and hash values corresponding to data stored at the addresses, ($A_{M+1}$, $Hash_1$) . . . ($A_{M+N}$, $Hash_N$). The third sub-cache 40*a* includes (Y+1) entries, storing hash values and their associated data, ($Hash_X$, Dx) . . . ($Hash_{X+Y}$, $Dx+_Y$). Each sub-cache 30*a*, 35*a*, 40*a* may include any number of entries, and the entries among the sub-caches 30*a*, 35*a*, 40*a* need not bear any relationship with one another. Rather, the subscripts are meant to convey that the sub-caches 30*a*, 35*a*, 40*a* have unique pairs of addresses, data, and/or hashes.

In some embodiments, the first, second, and third sub-caches 30*a*, 35*a*, 40*a* are all stored in the same random access memory (RAM). In other embodiments, the third sub-cache 40*a* is stored in storage class memory (SCM) or fast Flash conforming to a protocol such as non-volatile memory express (NVMe).

The first sub-cache 30*a* behaves like a conventional cache. Each entry in the first sub-cache 30*a* stores an address and its associated data. When the host 14*a* retrieves the data from a storage device 17, the host 14*a* populates an entry in the first sub-cache 30*a* with this information. Thus, subsequent requests for the same data can be fulfilled by searching the first sub-cache 30*a* according to an address and retrieving the associated data.

When the first sub-cache 30*a* does not include the data, the host 14*a* uses the address of the data to search the second sub-cache 35*a*, which stores data addresses and hash values corresponding to the data. In many embodiments, because the second sub-cache 35*a* stores hash values of data instead of the data itself, entries in the second sub-cache 35*a* are significantly smaller than entries in the first or third sub-caches 30*a*, 40*a*. Thus, the size of a second sub-cache 35*a* may be a fraction of the size of the amount of data in other hosts' third sub-caches 40*b*-40*n* that the techniques described herein make available to the host 14*a*. Advantageously, the techniques decrease I/O latency of read requests for a modest trade-off in memory use.

The host 14*a* uses the hash value and the translation table 26*a* to identify the host 14 that owns the dataspace portion that includes the data (also referred to herein as "owner host"). In the example depicted in FIG. 2, host 14*b* may be an owner host 14 for data being sought by host 14*a*. In various embodiments, certain bits of the hash value constitute the mask by which the owner host 14*b* is identified. For example, the mask may be the first byte of the hash value, the last byte, or any other byte, as would be appreciated by one of ordinary skill in the art. Furthermore, the mask may include more than one byte, in embodiments in which the computer system 10 includes enough hosts 14*a*-14*n* to require more than one byte to represent each host 14 uniquely.

The host 14*a* may use the mask with the translation table 26*a* to identify the owner host 14*b*. The translation table 26*a* depicted in FIG. 4 demonstrates one exemplary approach for accomplishing this task. The owner host 14*b* may be identified from the last two bits of the mask. A bit pattern of "00" corresponds to a first host ($Host_1$), "01" to a second host ($Host_2$), "10" to a third host ($Host_3$), and "11" to a fourth host ($Host_4$).

Although the size of the mask described above is one byte, masks of other sizes may be used. In many embodiments, the size is based on the number of hosts 14*a*-14*n* in the computer system 10. For example, a computer system 10 with sixteen (16) hosts 14*a*-14*n* may use a mask of one byte, and a computer system 10 with over two hundred fifty-six (256) hosts 14*a*-14*n* may use a mask of two bytes. If the number of hosts 14*a*-14*n* is less than the number of possible unique bit patterns, given the mask size, the mask may have dummy bits. In the example depicted in FIG. 4, because there are only four (4) hosts 14*a*-14*d*, only the rightmost two bits of the mask determine which host 14 owns the hash value and the corresponding data. In the embodiments described above, the hosts 14*a*-14*n* share equal ownership in the dataspace. For example, a computer system 10 with eight (8) hosts 14 may use a mask of a single byte, and each host 14 may own 32 out of the possible 256 hash values that may be represented by the byte. However, in other embodiments, the hosts 14 may own different sized portions. The portion size owned by a host 14 may be proportionate to the size of its cache 25. Hosts 14 that own larger portions of the dataspace may be assigned a larger proportion of the possible masks. For example, suppose a computer system 10 includes five (5) hosts 14, and three of the hosts 14 have caches 25 that are twice as large as the remaining two hosts' 14 caches. Each of the three hosts 14 with larger caches may own sixty-four (64) of the possible 256 hash values that may be represented by the byte, while the two remaining hosts 14 may each own thirty-two (32) of the possible 256 hash values.

In some embodiments, a host 14*a* may determine that it owns the desired data and searches its own third sub-cache 40*a* using the hash value retrieved from its second sub-cache 35*a*. In this manner, the host 14*a* retrieves the data from its own third sub-cache 40*a*. When a different host 14*b* owns the data, the host 14*a* sends a request with the hash value to the owner host 14*b*. The owner host 14*b* searches its third sub-cache 40*b* using the hash value and returns the corresponding data to the requesting host 14*a*.

The second and third sub-caches 35*a*-35*n*, 40*a*-40*n* of the hosts 14*a*-14*n* may be populated according to different techniques. In some embodiments, a host 14*a* may demote aging data stored in its first sub-cache 30*a* to the second and/or third sub-caches 35*a*, 40*a*. For example, when a host 14*a* loads new data into its first sub-cache 30*a*, the host 14*a* selects an entry, such as the least recently used (LRU) entry, to overwrite. If the host 14*a* also owns the hash value of the data for the LRU entry, the host 14*a* stores the hash value and the data in its third sub-cache 40*a*. The host 14*a* may also store the data address and hash value in its second sub-cache 35*a*.

In further embodiments, a host 14*a* may populate its own third sub-cache 40*a*, or the third sub-caches 40*b* of another host 14*b*, when retrieving data from the data storage system 12. In these situations, the host 14*a* is accessing the data storage system 12 because the data has not been cached anywhere in the computer system 10. The host 14*a* loads the data into its first sub-cache 30*a*, calculates the hash value of the data, and uses the hash value and translation table 26*a* to identify the owner host 14*b*. If the host 14*a* itself is the owner host, the host 14*a* loads the hash value and the data into its third sub-cache 40*a* for other hosts 14*b*-14*n* to access.

If the host 14*a* determines that another host 14*b* owns the data, the host 14*a* may inform the owner host 14*b* of the retrieved data (e.g., the host 14*a* posts a cache hit to the owner host 14*b*). In some embodiments, the host 14*a* sends the data and the hash value for the data to the owner host 14*b*, and in other embodiments, the host 14*a* waits for the owner host 14*b* to request the information.

When a host 14*a* loads a hash value and data into its third sub-cache 40*a*, the host 14*a* must select an entry to overwrite. The entry may be the least recently used (LRU) one. Alternatively, the cache replacement policy may be based on low inter-reference recency set (LIRS). None of the hosts 14*a*-14*n* maintain coherency between their third sub-caches 40*a*-40*n*, though the hosts 14*a*-14*n* maintain coherency of the second sub-caches 35*a*-35*n*. If an owner host 14*b* receives a request for data that has been removed from its third sub-cache 40*b*, the owner host 14*b* may return a cache miss. In some embodiments, the requesting host 14*a* requests the data from the data storage system 12 and loads the data into its first sub-cache 30*a*. Further, the host 14*a* may transmit the data to the owner host 14*b* to load into its third sub-cache 40*b*.

In various embodiments, a host 14*a* may opt not to store new data in its third sub-cache 40*a*. For example, the existing entries in the third sub-cache 40*a* may be maintained if they are being frequently accessed. If a host 14*a* owns the hash value for data that has been newly retrieved from the data storage system 12, this data may be loaded into the first sub-cache 30*a*, but not the third sub-cache 40*a*. The host 14*a* may even drop the data, without loading it into its first sub-cache 30*a*.

A host 14*b* may be informed by another host 14*a* that it owns data that the other host 14*a* retrieved from storage. If the host 14*b* opts to maintain the existing entries in its third sub-cache 40*b*, the host 14*b* does not respond to the other host 14*a*. If the host 14*b* receives the data and hash value, the host 14*b* may drop the information, without caching it.

When a host 14*a* generates and sends a write request to the data storage system 12, any cached data associated with that address becomes stale. In some embodiments, the host 14*a* may invalidate any corresponding entries in its first sub-cache 30*a*. However, the owner host 14*b* need not remove the stale data from its third sub-cache 40*b*. Rather, the data will age out until the owner host 14*b* overwrites the entry, according to the owner host's 14*b* cache replacement policy.

Figure 5:
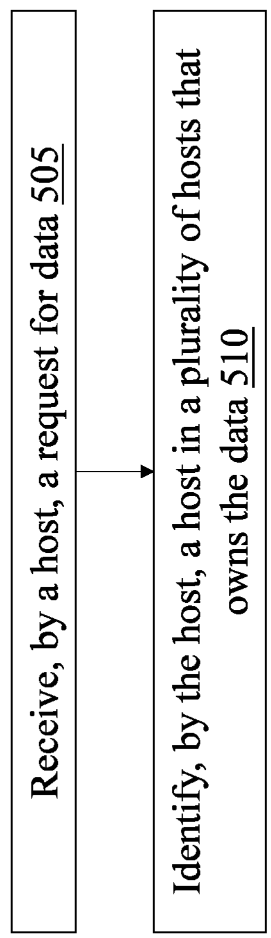
FIGS. 5-7 are exemplary flow diagrams of methods for host-based caching in a data storage system, according to techniques described herein.

FIG. 5 is an exemplary flow diagram of a method for host-based caching in a data storage system, according to techniques described herein. A host 14*a* receives a request for data (step 505). The host 14*a* identifies a host 14, in a plurality of hosts 14, that owns the data (step 510).

Figure 6:
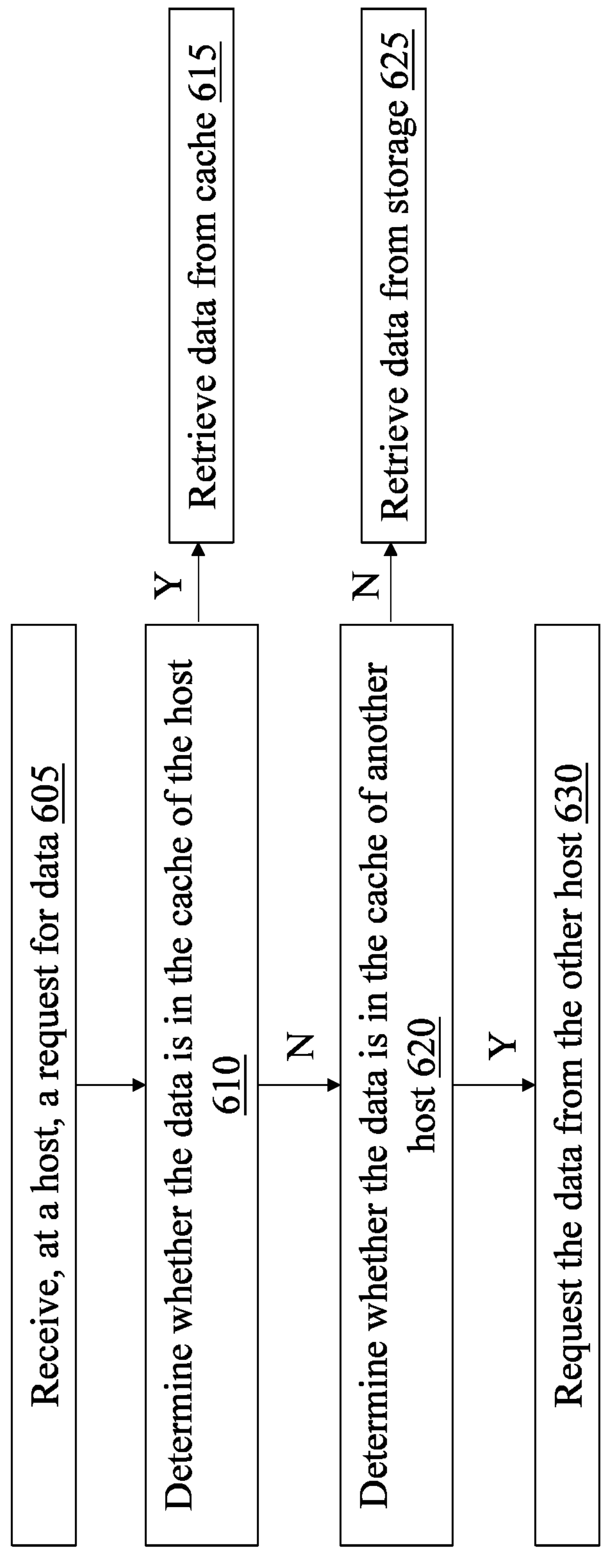

FIG. 6 is an exemplary flow diagram of another method for host-based caching in a data storage system, according to techniques described herein. The host 14*a* receives a request for data (step 605). The host 14*a* determines whether the data is in its cache 25*a* (step 610). For example, the host 14*a* may search a first sub-cache 30*a* for the data. If the data is found, the host 14*a* retrieves the data from its own cache 25*a*, namely first sub-cache 30*a* (step 615). Thus, the host 14*a* may post a cache hit.

If the data is not in the first sub-cache 30*a*, the host 14*a* determines whether the data is in the cache 25*b* of another host 14*b* (step 620). If not, the host 14*a* retrieves the data from storage (step 625) by, for example, sending a read request to a storage device 14 in a data storage system 12. If another host 14*b* owns the data, the host 14*a* requests the data from the owner host 14*b* (step 630).

Figure 7:
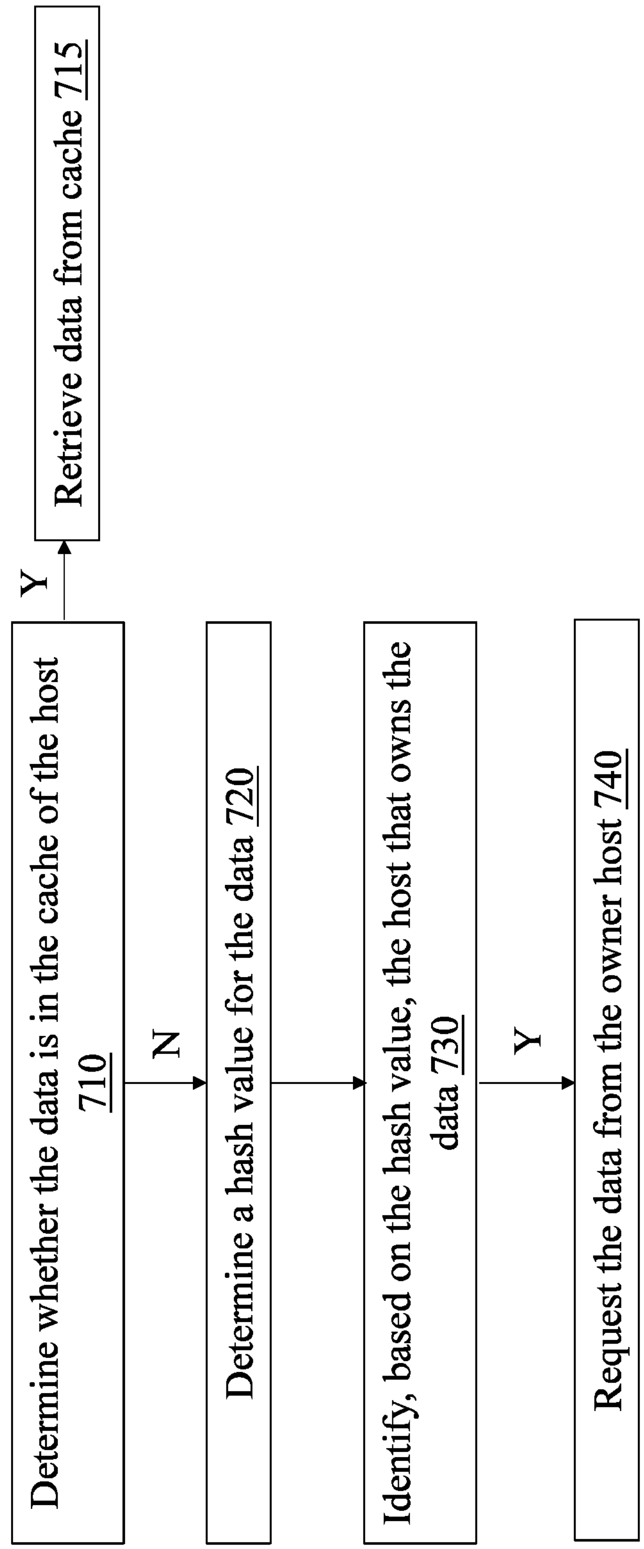

FIG. 7 is an exemplary flow diagram describing, in more detail, how one host 14*a* obtains data from the cache 25*b* of another host 14*b*. First, as in the method of FIG. 6, the host 14*a* determines whether the data is in its own cache 25*a* (step 710). If so, the host 14*a* retrieves the data from its own cache 25*a*, namely, its own first sub-cache 30*a* (step 715). If not, the host 14*a* determines a hash value for the data to identify the owner host 14*b* of the data (step 720). In some embodiments, the host 14*a* searches its second sub-cache 35*a* for the data address to retrieve the hash value. If the second sub-cache 35*a* does not include an entry with the data address, the host 14*a* retrieves the data from storage. If the second sub-cache 35*a* does include such an entry, the host 14*a* identifies, based on the hash value, the host 14*b* that owns the data (step 730). In some embodiments, the host 14*a* identifies the owner host 14*b* using the hash value and translation table 26*a*. The host 14*a* may match a mask in a translation table 26*a* to the hash value to identify the owner host 14*b*. Then, the host 14*b* requests the data from the owner host 14*b* (step 740).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for host-based caching, the method comprising:

receiving, by a host, a request for data;

if the host determines the data is not in a first cache determining, by the host, a hash value corresponding to the data by searching a second cache associated with the host using an address associated with the data for the hash value, wherein the hash value corresponds to one of a plurality of hosts on which the data is stored, wherein the first cache comprises addresses and associated data and the second cache comprises addresses and hash values;

applying, by the host, a mask to the hash value; and matching, by the host, the masked hash value with a bit pattern associated with a host of the plurality of hosts to identify a host that owns a dataspace portion that includes the data so as to store the data in its cache for sharing with other hosts in the plurality of hosts.

2. The method of claim 1, wherein each host in the plurality of hosts own a unique portion of the dataspace so as to store data associated with its unique portion in its cache for sharing with other hosts.

3. The method of claim 1, wherein matching the masked hash value with the bit pattern associated with the host comprises:

determining that the host that received the request for the data owns the dataspace portion that includes the data.

4. The method of claim 3, further comprising:

retrieving, by the host, the data from it own the first cache.

5. The method of claim 1, further comprising:

requesting, by the host, the data from the host that owns the dataspace portion that includes the data.

6. The method of claim 1 wherein matching the masked hash value with the bit pattern associated with the host comprises:

searching a translation table for a subset of bits from the hash value; and identifying a host associated with the subset of bits.

7. The method of claim 1, further comprising:

requesting, by the host, the data from the host that owns the dataspace portion that includes the data.

8. The method of claim 7, wherein requesting the data from the host that owns the dataspace portion that includes the data comprises:

sending, by the host, the hash value to the host that owns the dataspace portion that includes the data.

9. The method of claim 1, further comprising:

receiving, by the host, data from the dataspace portion owned by the host from another host in the plurality of the hosts; and storing, by the host, the data in a cache designated for sharing with other hosts in the plurality of hosts.

10. A system for use in host-based caching, the system comprising a processor configured to:

receive a request for data;

if the host determines the data is not in a first cache determine, by the host, a hash value corresponding to the data by searching a second cache associated with the host using an address associated with the data for the hash value, wherein the hash value corresponds to one of a plurality of hosts on which the data is stored, wherein the first cache comprises addresses and associated data and the second cache comprises addresses and hash values;

apply, by the host, a mask to the hash value; and match the masked hash value with a bit pattern associated with a host in a plurality of hosts to identify a host that owns a dataspace portion that includes the data so as to store the data in its cache for sharing with other hosts in the plurality of hosts.

11. The system of claim 10, wherein each host in the plurality of hosts own a unique portion of the dataspace so as to store data associated with its unique portion in its cache for sharing with other hosts.

12. The system of claim 10, wherein the processor is further configured to:

determine that the host that received the request for data owns the portion of the dataspace that includes the data.

13. The system of claim 12, wherein the processor is further configured to:

retrieve the data from the first cache.

14. The system of claim 10, wherein the processor is further configured to:

request the data from the host that owns the dataspace portion that includes the data.

15. The system of claim 10, wherein the processor is further configured to:

search a translation table for a subset of bits from the hash value; and identify a host associated with the subset of bits.

16. The system of claim 10, wherein the processor is further configured to:

request the data from the host that owns the dataspace portion that includes the data.

17. The system of claim 16, wherein the processor is further configured to:

send the hash value to the host that owns the dataspace portion that includes the data.

18. The system of claim 10, wherein the plurality of hosts collectively own an entirety of the dataspace.

19. The system of claim 10, wherein portions of the dataspace owned by each host are equal in size.

20. The system of claim 10, wherein portions of the dataspace owned by each host vary in size.

* * * * *